United States Patent [19]

Hardy et al.

[11] Patent Number: 5,261,012
[45] Date of Patent: Nov. 9, 1993

[54] METHOD AND SYSTEM FOR THINNING IMAGES

[75] Inventors: Robert M. Hardy, Scotia; James E. Wheeler, Schenectady, both of N.Y.; John R. Meckley, Voorhees, N.J.

[73] Assignee: General Electric Company, Syracuse, N.Y.

[21] Appl. No.: 881,108

[22] Filed: May 11, 1992

[51] Int. Cl.⁵ ............................................. G06K 9/44
[52] U.S. Cl. ...................................... 382/55; 382/27; 382/54
[58] Field of Search ............... 382/27, 55, 4, 56, 41, 382/49, 54

[56] References Cited

U.S. PATENT DOCUMENTS

| | | | |
|---|---|---|---|
| 3,196,398 | 7/1965 | Baskin | 382/55 |
| 3,975,709 | 8/1976 | Beun et al. | 382/55 |
| 4,003,024 | 1/1977 | Riganati et al. | 382/4 |
| 4,603,430 | 7/1986 | Sacks | 382/41 |
| 4,736,439 | 4/1988 | May | 382/27 |
| 4,797,806 | 1/1989 | Krich | 358/903 |
| 4,949,390 | 8/1990 | Iverson et al. | 382/55 |
| 4,979,221 | 12/1990 | Perryman et al. | 382/27 |
| 5,062,142 | 10/1991 | Meckley | 382/27 |
| 5,103,484 | 4/1992 | Stafford et al. | 382/55 |
| 5,148,500 | 9/1992 | Belanger | 382/55 |

Primary Examiner—Joseph Mancuso
Attorney, Agent, or Firm—Paul Checkovich; Stephen A. Young

[57] ABSTRACT

Image data is subjected to a thinning process so as to derive a medial axis for each image. Boolean image data is reduced to lines and/or dots, each line generally being a centroid line of an image. The thinning process uses a change look-up table which is addressed using values from pixels in the neighborhood of a particular pixel which is the target for possible change. Pixels in the neighborhood which are to be evaluated are given a weight by use of a weight look-up table and the weight of the pixel is multiplied by the value of the pixel. Alternately, the weight of the pixel may be added to the pixel value. The pixels in the neighborhood of a target pixel (i.e., pixel which is being evaluated for possible removal) have their weights and values taken into account by a summation of the results of the multiplication (or addition) performed for each pixel so as to provide an address used to address a change look-up table which supplies an output indicative of change in the target pixel. The thinning is accomplished by a floating point processor using a pipelined procedure.

24 Claims, 8 Drawing Sheets

METHOD AND SYSTEM FOR THINNING IMAGES

BACKGROUND OF THE INVENTION

This invention relates to a method and system for thinning images in an image data processing system. More specifically, this invention relates to use of a processor for extracting centroid lines (medial axes) from binary images.

There are various imaging systems in which processing of image data is very helpful in order to allow better recognition of particular features. For example, a sonar system uses various data processing techniques to improve target identification and classification. An infrared imaging system may likewise use data processing techniques to improve target identification in connection with a weapons system. Image data processing for making certain features or objects more recognizable may also be used in conjunction with various medical imaging techniques. A tomographic medical imaging system might use data processing techniques to make a tumor more recognizable.

Imaging systems may use a thinning process in order to make certain features stand out. The image data would be Boolean, meaning that each pixel is either one or zero (i.e., black or white; or on or off). If the image is not initially Boolean, the image data is clipped or compared to a threshold in order to produce a Boolean image. The process of thinning involves whittling away at images in the image data from all four sides. By performing this process sufficiently, all pixels remaining in the one state either represent one-pixel dots, or connect in such a way as to represent a line or lines. Certain features such as potential targets within a zone of interest (i.e., the zone subjected to imaging) will be more easily recognizable, either by a person viewing the image or by pattern recognition computer arrangements.

An image of conventional size, such as 512 pixels by 512 lines, consists of more than a quarter million pixels. Such an image may be conveniently processed on a parallel computing machine structured for Boolean operations such as the Thinking Machines Corp Connection Machine. However, it is extremely time consuming to perform a thinning process on a machine structured and used primarily for floating point arithmetic. Certain applications, such as target identification in military imaging systems, must process large amounts of image data in real time. Ideally, one would use a parallel computing machine structured for Boolean operations for performing the thinning process and would use a machine (floating point processor) structured and used primarily for floating point arithmetic in order to perform the numerous floating point operations commonly required in conjunction with such target imaging systems. However, it often is too expensive to have a Boolean processor for Boolean operations and a separate floating point processor for the various math floating point operations. At the same time, a floating point processor is poorly structured to handle the numerous if statements commonly required for thinning processes. A floating point processor may simply be unable to handle the required if statements quickly enough to allow real time thinning of images.

U.S. Pat. No. 5,062,142 issued on Oct. 29, 1991 to John R Meckley, one of the co-inventors of the present application. That patent, which is assigned to the assignee of the present application and hereby incorporated by reference, discloses a process and system for producing medial axis representations by thinning image data. A target pixel is considered for possible change by latching values of pixels in its neighborhood to generate an address supplied to a look-up table. Although that invention is very useful, the specific techniques described therein are not well-suited for use in a floating point processor type of system.

OBJECTS AND SUMMARY OF THE INVENTION

Accordingly, it is a primary object of the present invention to provide a new and improved thinning method and system.

A more specific object of the present invention is to provide for thinning of image data in real time using a floating point processor with pipelining and with minimal use of if statements.

A further object of the present invention is to provide for the thinning of image data in place so as to limit memory requirements.

A still further object of the present invention is to provide for thinning of image data with a minimum amount of calculations required and, therefore, with a minimum amount of time required to perform the thinning.

The above and other objects of the present invention which will become more apparent as the description proceeds are realized by a method of thinning images in an image data processing system. A line direction is initially defined as extending in a first direction. Image data is then scanned in an image memory in a scan pattern line by line, each line extending in the line direction, in order to determine whether pixels of image data in the lines should be changed in order to thin images in the image data. By way of the scanning, a particular pixel A is selected for consideration for possible change. The A pixel has corresponding pixels B, C, D, E, F, G, H, and I around it to define a pixel neighborhood about that pixel A. A line from pixel B to pixel A extends in the line direction and pixels C through I are disposed in clockwise order from pixel B and around and adjacent to pixel A. An address is generated which is associated with pixel A and which is dependent on values of at least a plurality of the pixels C–I (i.e., C through I). The address is generated by a floating point processor using a pipelined procedure. A change look-up table stored in a memory of the image data processing system is addressed using the generated address so as to read out a change signal indicative of whether a change should be made in the value of pixel A. The value of pixel A is changed if the change signal indicates that it should be changed. The steps from the scanning to the changing are repeated for different selected pixels A, one pixel A being selected at a time. Having completed the above step for the line direction extending in the first direction, the steps are then repeated for the line direction extending in a second direction, then a third direction, then a fourth direction. Each of the first, second, third, and fourth directions are perpendicular or anti-parallel (i.e., parallel, but extending in opposite directions) to each of the other of the first, second, third, and fourth directions. The changing of values of the pixels causes the thinning of images in the image data. The above steps are then repeated for first, second, third, and fourth directions as necessary until the resulting image data is limited to images of lines and/or dots.

The address generated for association with each pixel A is a function of values of the corresponding pixels C through I. More specifically, the address generated for association with each pixel A corresponds on a one-to-one basis with a combination of values of the corresponding pixels C–I.

The step of generating the address includes addressing a weight look-up table to assign a weight to each of the pixels C–I, performing a pixel arithmetic operation for each of the pixels C–I using the weight and the value for the pixel, and combining results of the pixel arithmetic operations to provide the address. More specifically, the weights are assigned to a pixel by using a pixel number, which corresponds to the order of the pixel in a particular sequence of the pixels C–I. The pixel number addresses a weight look-up table so as to output a weight for a pixel. The combining is performed by adding the result of the pixel arithmetic operations. The pixel arithmetic operations may be the multiplication of the weight of a pixel by a value of the pixel or, alternately, the addition of the weight of a pixel to a value of the pixel. The pixel arithmetic operations are floating point operations.

A particular pixel A is changed only if k is not one and n is less than four where k is the number of pixels C–I having a value of one and n is the number of neighbor state changes about A. (The neighbor state changes would correspond to changes between adjacent pixels so that if C is one and D is zero, the interface between C and D constitutes one neighbor state change. If C is one and D is one, there is no state change at that interface.) The method further includes the detecting of energy in a form dependent on, and representative of, a zone under test. The image data which is to be subjected to the thinning process is generated from the energy which is detected. Image data resulting from completion of the changing of values of pixels is displayed. Depending on the type of imaging system, the method may further include the applying of energy to the zone under test such that the energy which is detected results from the applied energy.

The address generated for association with a particular pixel A is independent of pixel values other than the values of corresponding pixels C, D, E, F, G, H, and I. The change look-up table outputs a change signal having only two values, a change to zero value if a particular pixel A is to be changed and a no change ever value if a particular pixel is not to be changed. The change signal is a pix out value which is written into the image memory to change the image data in place.

The system of the present invention includes a means to establish a line direction sequentially in first, second, third, and fourth directions. Each of the first, second, third, and fourth directions is either perpendicular or anti-parallel to each of the other of the first, second, third, and fourth directions. A scanning means scans image data in a scan pattern line by line, each line extending in the line direction, in order to determine whether pixels of image data in the line should be changed so as to thin images in the image data. A selecting means selects, by way of the scanning, particular pixels to be considered for possible change. Each particular pixel A has corresponding pixels B–I around it to define a pixel neighborhood about that pixel A. A line from pixel B to pixel A extends in the line direction. An address generating means generates an address which is associated with pixel A and which is dependent on values of at least a plurality of the corresponding pixels B–I. A change look-up table stored in memory is addressable by the address associated with pixel A to read out a change signal indicative of whether a change should be made in pixel A. Means for changing the value of pixel A changes its value if the change signal indicates that it should be changed. The changing of values of pixels causes the thinning of images in the image data.

A detector detects energy in a form dependent on, and representative of, a zone under test. An image generator generates the image data based upon the energy which is detected. A display displays image data resulting from completion of the changing of values of pixels. The system may further include means for applying energy to the zone under test, in which case the energy which is detected results from the applied energy.

The means for changing the value of pixel A changes values so as to limit the image data to images of lines and/or dots. The address generating means generates an address for association with a particular pixel which is a function of values of the corresponding pixels B–I. More specifically, the address which is generated corresponds on a one-to-one basis with a combination of values of the corresponding pixels B–I. The address generating means includes a means for assigning a weight to each of the pixels C–I, a means for performing a floating point pixel arithmetic operation for each of the pixels C–I using the weight and the value for the pixel, and a means for combining result of the pixel arithmetic operations to provide the address. The means for performing is part of a floating point processor. The address generating means operates in a pipelined procedure to generate addresses.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
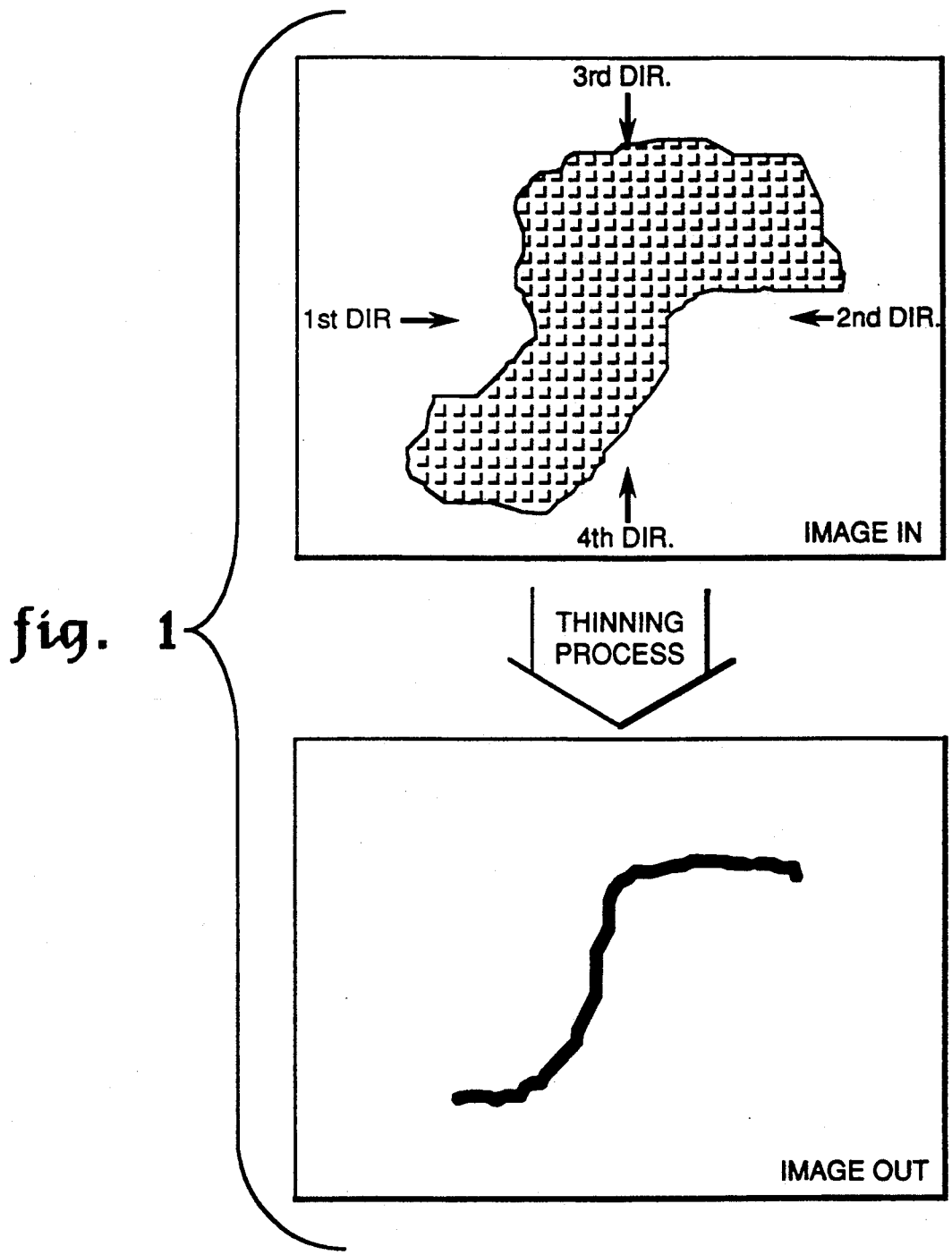
FIG. 1 shows image data before and after a thinning process is performed upon it.

With reference initially to FIG. 1, the Image In is image data from an imaging system and is shown in the form of a frame. One may wish to process that Image In in order to make certain features stand out. For example, if the Image In is image data from a passive sonar system, one may wish to apply a thinning process to that data so as to allow certain features of the image to be more easily determined. The features emphasized by the thinning process may improve one's ability to recognize the type of ship or submarine which is causing the image. Alternately, or additionally, the thinning process may allow one to more readily determine the direction in which the ship or submarine corresponding to the image is headed. The bearing or heading of the potential target and identification of the potential target, as well as other characteristics, may be more readily recognizable following the application of a thinning process which changes the Image In into the Image Out of FIG. 1. The thinning process essentially consists of a whittling away of a one pixel wide strip from an image repeatedly in four different directions in order to yield a line which is one pixel wide. The line is preferably a medial axis without breaks in its as discussed in the incorporated by reference Meckley patent mentioned above.

The image data of the format shown in FIG. 1 is assumed to be initially represented by ones and zeros, i.e., black and white or on or off. If that is not the case, for the image data initially, then the image data would be clipped or compared to a threshold first to produce this Boolean image of ones and zeros. The process of thinning involves the repetition of raster scanning such that whittling away occurs from all four sides. That is, in effect, raster scanning is left to right, right to left, top to bottom, and bottom to top and would be repeated until only single pixel wide lines (and possibly dots) are left. That means that all pixels remaining in the one state either represent one-pixel dots, or connect in such a way as to represent a line or lines. When the four way scan produces no more whittling away of pixels in the one state, the thinning process is done.

Figure 2:
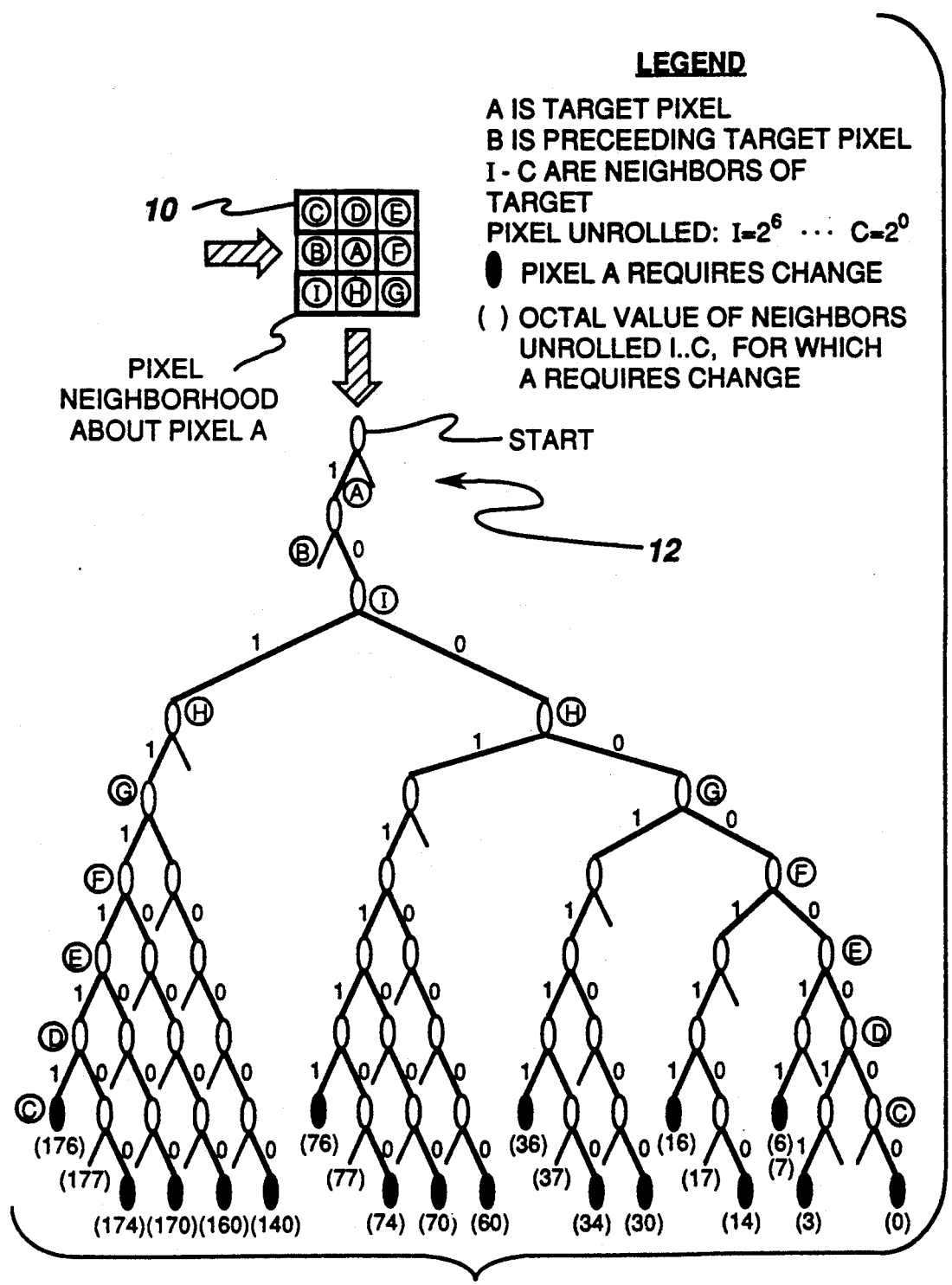
FIG. 2 shows a thinning decision tree which might be used for performing a thinning process.

Turning now to FIG. 2, the thinning process will be explained with reference to a thinning decision tree. In order to determine whether a particular target pixel A should be changed, one must consider the eight pixels B-I which are disposed around it. Various examples are given in the incorporated by reference Meckley patent as to when the pixel should be changed, but a brief discussion will be presented herein. It should be noted that the Meckley patent uses numerals to refer to the nine pixels and, for example, refers to the target pixel as pixel five, whereas the present discussion will refer to the target pixel as pixel A. At the top of FIG. 2, the pixels 10 constitute a neighborhood of pixels about pixel A. Pixel B is the proceeding target pixel and, therefore, it would be appreciated that the arrangement of pixel neighborhood 10 is shown based on the assumption that one is scanning from left to right. If one was scanning at a particular moment from right to left, the pixel B would be in the location of pixel F in FIG. 2. In similar fashion, pixel B would be disposed in the position for pixel D if one was scanning from top to bottom and would be in the position of pixel H if one was canning from bottom to top in FIG. 2. The remaining pixels around pixel A would be rotated accordingly depending upon the direction of scan. Proceeding clockwise from pixel B are pixels C-I.

Turning now to the decision tree 12, the initial decision is to determine if pixel A is one or zero. If pixel A is zero, one would proceed along the right branch from the start of the tree. Specifically, if pixel A is already zero, there would be no reason to consider whether it should be changed to zero as part of the thinning process. However, if pixel A is one, then the tree shows that pixel B would next be evaluated. If pixel B is zero, we would next proceed to evaluate pixel I. The remaining pixels would be evaluated following the decision tree. As indicated in the legend of FIG. 2, a shorthand notation for the possible combination of pixels C-I may be derived by considering pixels C-I to be weighted sequentially between the zeroth power of two up to the sixth power of two. In that fashion, each combination of values for C-I may be represented as a binary number having seven digits. This in turn may be converted into an octal number and the octal numbers are in parenthesis to represent the 22 combinations of values of C-I which correspond to a situation where the target pixel A should be changed. The conditions under which the target pixel A should be changed are described in the incorporated by reference Meckley application, but that application refers to S1 as the sum of the weight neighbors of the target pixel and S2 as the number of successive pairs of neighboring pixels having different values. For the discussion in this application, the variable k will be used to represent the number of neighbors with value one (corresponds to S1 of the Meckley patent) and the variable n will be used to represent the number of neighbor state changes such as zero to one or one to zero in the pixels neighboring pixel A (thus, n corresponds to S2 of the Meckley patent). The A pixel should be changed if k is not equal to one and n is less than four.

The decision tree of FIG. 2 may be conveniently processed on a parallel computing machine structured for Boolean operations such as the Thinking Machines Corp Connection Machine. However, it is extremely time consuming to implement the numerous if statements of this decision tree in a machine or processor structured and used primarily for floating point arithmetic. Accordingly, and as discussed in more detail below, the present invention will provide the same essential type of results as the if statements for a decision tree like that of FIG. 2, but with a minimum use of if statements.

Figure 3:
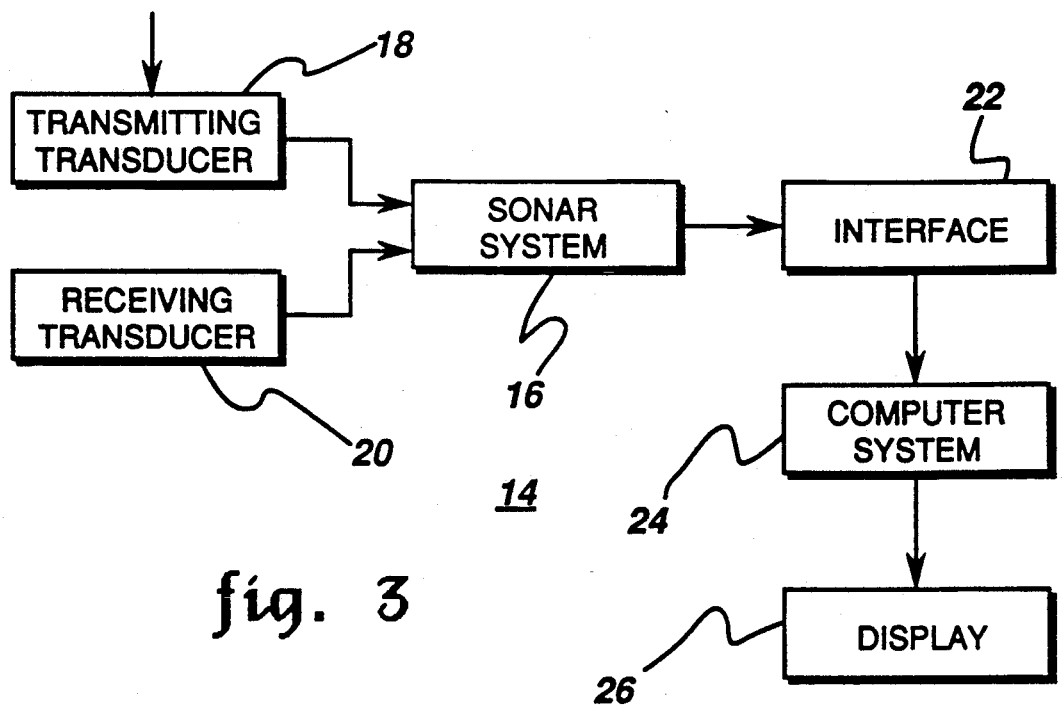
FIG. 3 shows an overall block diagram of an embodiment of the present invention.

Before discussing the particular process used by the present invention, the image data processing 14 according to the present invention will be discussed with reference to FIG. 3. FIG. 3 shows a sonar system 16 having a transmitting transducer 18 and a receiving transducer 20. The transmitting transducer would apply sound energy to a zone of interest, whereas the receiving transducer 20 would receive reflected sound energy to provide the sonar system 16 with appropriate image data. The transmitting transducer 18 is optional in that the sonar system 16 might be passive and simply detect sound energy generated by potential targets by using the receiving transducer.

Although FIG. 3 shows a sonar system 16, various other imaging systems such as infrared imaging, radar, video or television camera systems, or any of various types of medical imaging systems might be utilized.

The imaging system such as sonar system 16 is connected to an interface 22 which in turn supplies image data to a computer system 24 connected to a display 26. The details of the sonar system 16, transducers 18 and 20, and interface 22 need not be discussed as these components may be relatively standard components.

Advantageously, the display 26 will display image data which has been thinned using the process disclosed herein. The computer system 24 is a floating point processor type of system, meaning that it is structured and used primarily for floating point arithmetic.

Figure 4:
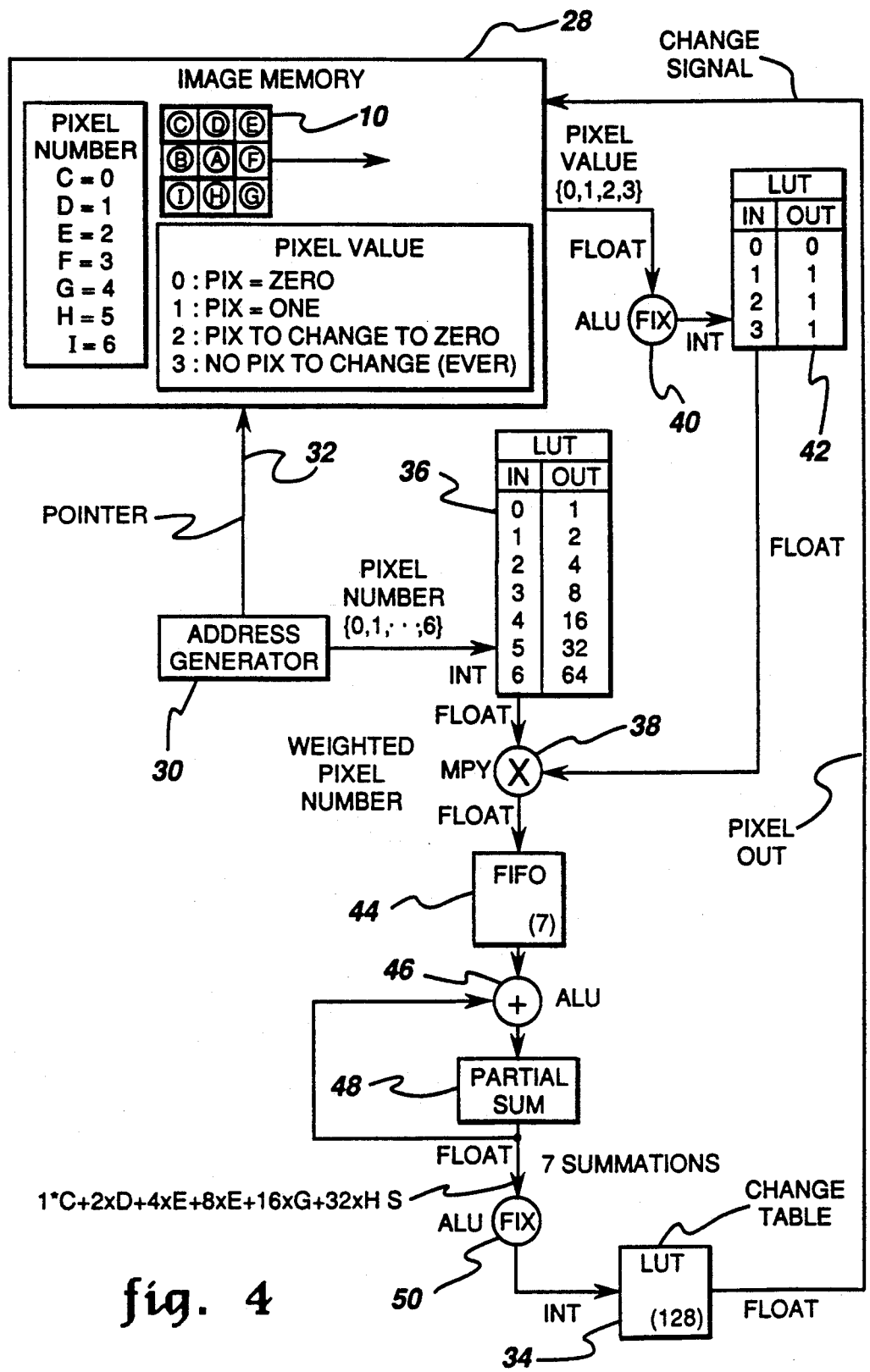
FIG. 4 shows a diagram illustrating pipelined thinning according to the present invention.

Turning now to FIG. 4, the arrangement by which the computer system 24 of FIG. 3 carries out the thinning process will be discussed. An image memory 28 has image data disposed therein. The image or pixel data disposed in memory 28 would correspond to a Boolean image supplied to memory 28, which is part of the computer system 24 (refer back momentarily to FIG. 3) as supplied from the sonar system 16 of FIG. 3. Typically, the image memory 28 will have 512 by 512 pixels (i.e., storage locations corresponding to pixels). The image data will be scanned in four different directions as previously discussed. In FIG. 4, it is assumed that the image data is being scanned from left to right. The neighborhood of 10 of pixel A is shown as being within the memory 28. Additionally, various values for the pixel numbers and the pixel values serve as a legend and are shown in memory 28 simply for ease of illustration. An address generator 30 scans the image memory 28 with a pointer 32, shown simply as an arrow, serving to select a particular pixel within image memory 28.

Upon selecting a pixel A for consideration, it will be appreciated that pixel A would be a target for possible change only if A is equal to one and has not been examined before, and pixel B (the immediately proceeding target pixel) has a value of zero and was not changed by the immediately previous operation when B occupied the A position. In other words, the pixel A is a target if it is at the edge of the image which faces the scan line direction.

If A is a target, pixels B-I will be examined in order in somewhat similar fashion to the incorporated by reference Meckley patent. A will be changed if k is not equal to one and n is less than 4, where k is the number of neighbors with value one and n is the number of neighbor state changes. Otherwise, A will be marked for no change so as to prevent future examination in a later scan.

When the data for image memory 28 is first supplied to the computer system 24 from the sonar system 16 (refer back momentarily to FIG. 3), the pixel or image data in memory 28 consists of ones and zeros only. However, the present process uses pixel values of 2 to represent that the pixel will be changed to 0 and uses a pixel value of 3 to represent that no pixel change will ever be made and the pixel need not be examined again. These pixel values of 2 and 3 are temporary values used during the thinning process. They advantageously allow the image data to be changed in place (i.e., in the same memory location from which it was retrieved) and help avoid a need for separate memories for before and after thinning.

For the nine-pixel cluster in the neighborhood 10, there are 512 possible combinations. However, the conditions of A is equal to one and B is equal to zero must be met in all cases before proceeding to the examination discussed above. Therefore, only 128 combinations are left. Using the heuristic process from the Meckley patent, the table 1 appendix to this application was generated and it illustrates only the 22 out of 128 combinations in which point A should be changed from one to zero.

The seven-pixel string of pixel I through pixel C (counterclockwise about A, starting at I, or clockwise starting at C) can be converted to addresses for a 128 value look-up table 34. The look-up table (LUT) 34 serves as a change table and supplies a change signal indicative of whether the particular pixel A should be changed to 0 or marked for no change ever. The table 34, which may be stored in a read-only-memory or any other type of memory has a parenthetical number at its lower right, which simply indicates that it has 128 storage locations disposed within it.

The arrangement between the image memory 28 and the change table 34 will serve as an address generating means to address the proper storage location within change table 34. Initially, pixel C, having a pixel number of zero, is supplied to a weight table 36. The weight look-up table 36 assigns a weight, corresponding to a power of two for each integer pixel number supplied to it. As readily apparent from the output values or weights given for weight look-up table 36 in FIG. 4, a unique weight is given to each of the pixels. That is, the weight is unique in that no two pixels within that neighborhood are given the same weight. AS further illustrated in the table shown within look-up table 36, the weights are independent of the values (i.e., image data) of the particular pixel being assigned a weight and independent of values of adjacent pixels. For example, pixel C has a pixel number of 0 and would always have a weight of 1 regardless of whether its pixel value is 0, 1, 2, or 3 as shown by table 36 in the FIG. 4 embodiment. The weight is output from table 36 and supplied to a multiplier 38 in floating point representation, this output being a weighted pixel number.

The pixel value read out of memory 28 is supplied to an ALU 40 which converts the floating point value to an integer which addresses a value table 42. The value table 42 is used to handle the situation where the pixel value is two or three. Specifically, the value table 42 will output the original pixel value if that pixel value was zero or one. However, if the pixel value was two or three, the value table 42 will output a value of one. The output of table 42 is a floating point representation which is supplied to the multiplier 38. When the weighted pixel number is supplied to multiplier 38 from table 36, the value of that pixel is supplied to multiplier 38 from value table 42. The multiplication result is a floating point representation which may be supplied to a FIFO memory 44. Note that the FIFO memory 44 may be needed in processors with pipeline delays between floating point operand input and output (e.g., using conventional Weitek ALUs) to allow time sharing of the ALUs. For a more advanced processor such as an iWarp, the FIFO unit would not be required. Also, if pipelining is among cells, e.g., several cells each having one ALU, time sharing of the ALUs would not be required.

Whether the FIFO 44 is used or not, the products from the seven multiplications (C, D, E, F, G, H, I) performed by 38 are supplied to ALU 46 which leads to partial sum block 48 and completes a summation of all the results from the seven multiplications performed previously. The result from block 48 is supplied to ALU 50. That result is a seven bit number which is uniquely associated with the pixel values of pixels C-I. In other words, for a particular output of block 48, there was only one possible combination of values for C-I which could have produced this (for these purposes it will be considered that a pixel value of two or three is actually a pixel value of one, it being noted that two and three do correspond to pixel values of one, but include some additional information). The output of block 48 is S where $$S = 1 \times C' + 2 \times D' + 4 \times E' + 8 \times F + 16 \times G' + 32 \times H' + 64 \times I'$$

where the prime on each pixel value such as C' means that it is equal to the pixel value such as C for cases where C is 0 or 1 and is equal to 1 for cases where C is 2 or 3. In other words, pixel values of 2 and 3 are treated as values of 1 for purposes of the address. (This is evident from the value Table 42.) The ALU 50 changes the floating point representation of the result from the seven summations to an integer which is supplied to the change table 34 and causes it to output a change signal in floating point form. The change signal may specifically be a pix out value written back into memory 28 at the location of the original value of pixel A.

The various look-up tables used with the present invention may be stored in one or more ROMs or in a read/write memory.

Figure 5:
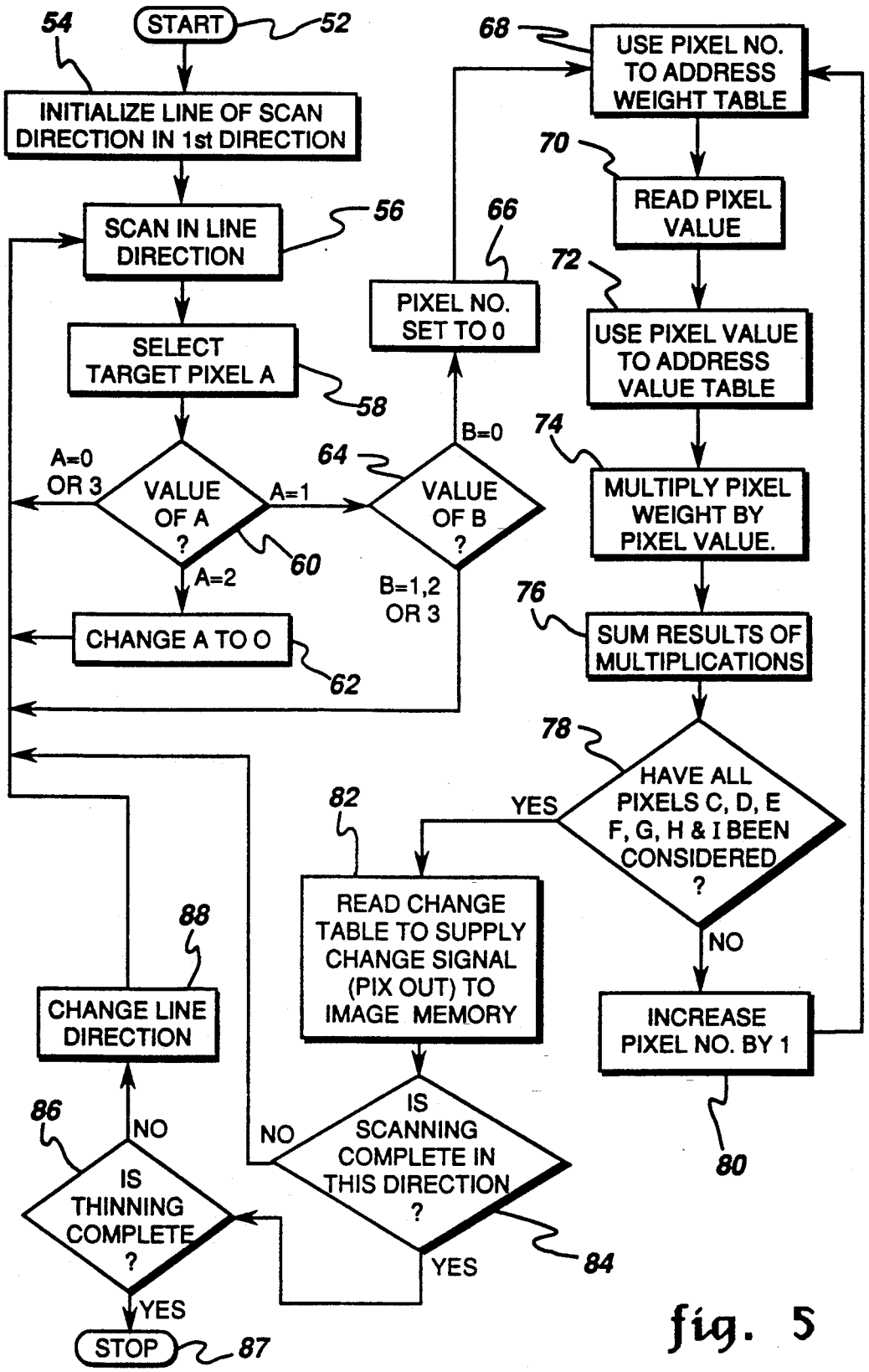
FIG. 5 is a simplified flow chart of the steps used for pipelined thinning according to the present invention.

The simplified flow chart of FIG. 5 may help explain the operation of the present invention in conjunction with FIG. 4. Start 52 leads to block 54 which initializes the line direction for the scan lines in a first direction (usually this would be left to right). Block 54 leads to block 56 which simply involves scanning the image memory 28 (refer back momentarily to FIG. 4) by use of the address generator 30. For the scan direction of left to right, the top line of pixel or image data would be scanned, then the second line from the top would be scanned, then the third line from the top, etc. In similar fashion, when the line direction is set in a second direction corresponding to right to left (anti-parallel to the first direction), one would scan the top line, then the next line down, etc. When the line direction is set in a third direction (perpendicular to the first direction), one would scan pixels from top to bottom beginning first with a line of pixels along the left edge of the image then in a vertical line just to the right of the left edge, then in a vertical line two pixels over from the left edge, etc. In similar fashion, when the line direction is set in a fourth direction, the pixels would be scanned beginning at the bottom of the frame or image and proceeding up along a vertical line at the left edge, then proceeding up along a vertical line one pixel over from the left edge, then along a vertical line two pixels over from the left edge, etc. For ease of illustration, FIG. 5 does not expressly show blocks which would restart scanning on the next line down (or over) from the line which was previously scanned, but such techniques are relatively well known and need not be described in detail. Following block 56 is block 58 which selects a target pixel A corresponding to the address at which the scan is disposed. Block 58 leads to block 60 which tests for the value of A. Note that, although the arrangement of FIGS. 4 and 5 tremendously reduces the number of if or decisional operations required for the thinning process as compared to the large number of if decisions illustrated in the decision tree of FIG. 2, the invention does include some if or decisional operations. An alternative to further reduce the number of decisional or if operations will be discussed below.

If block 60 indicates that the value of A is zero, it clearly is not a target for change and block 60 then leads back to block 56. If block 60 indicates that the value of A is three, this means that the particular target pixel is part of a medial axis and has previously been marked to indicate that it has a value of one and should never be changed. Accordingly, block 60 also leads back to block 56. If the value of A is two, that means that the particular pixel A had been marked for change to zero on the previously pass or scan along this line. Control transfers from block 60 to block 62 which changes the value of A to zero and returns to block 56.

If block 60 indicates that the value of A is one, the pixel A is still a possible target for change. Control transfers to block 64 which then tests the value of B, the immediately proceeding target pixel. If B has a value of one, that means that pixel A is not at the edge of the image facing the scan direction. Since the thinning process involves removal of only a single pixel strip along the edge facing the direction of scan, a value of one for B indicates that the particular potential target pixel A is not suitable for change. If B is one, block 64 leads to block 56. Likewise, if B has a value of three, which effectively means that B has a value of one and should never be changed, block 64 leads to block 56. If B has a value of two, that means that the process has just immediately previously marked pixel B for change to zero. Since the process is only supposed to remove a one pixel wide strip along the edge of the image, a value of two for pixel B indicates that the corresponding pixel A should not be considered a target. Accordingly, block 64 also leads in that case back to block 56.

If block 64 indicates that B is equal to zero, block 64 leads to block 66 which sets a pixel number equal to zero (see the pixel numbers illustrated in the legend of the image memory 28 of FIG. 4). Block 66 leads to block 68 which indicates that the pixel number is used to address a weight table, such as weight table 36 of FIG. 4. It should be emphasized that the flow chart of FIG. 5 is illustrative of the principles of operation of FIG. 4, but does not show the pipelining which allows several blocks following block 68 to be performing their functions at the same time. Block 68 leads to block 70 wherein the pixel values are read from the image memory 28 (FIG. 4 only). Next block 72 uses the pixel value to address the value table 42 of FIG. 4. Block 74 then multiplies the pixel weight by the pixel value (pixel values of two and three are treated as pixel values of one by operation of the value table 42). The product of the multiplication is summed in block 76. Following block 76, block 78 tests to determine if all the pixels C–I have been considered. Assuming that they have not been all considered, block 78 leads to block 80 which increases the pixel number by one so that the next pixel may be considered upon returning to block 68. Again it should be emphasized that the pipelining feature of the present invention is not shown by the flow chart, but would be more readily understood by considering FIG. 4 and FIG. 6 as discussed below.

Upon block 78 indicating that all pixels have been considered, the sum of the results of the seven multiplications performed by block 76 is used at block 82 to read the change table 34 of FIG. 4 so as to supply a change signal. More specifically, the change signal is preferably a pix out signal which will either be a two indicating that the pixel A is to be changed to zero or a three indicating that the pixel A is not to be changed (i.e., it is part of a medial axis). The pix out is supplied to the image memory. Referring again briefly to FIG. 4, the pix out signal may simply be written back into the image memory at the same location where the original value of the particular target pixel A was stored. In other words, the image data within image memory 28 is changed in place. For purposes of writing into the image memory 28, the address generator 30 may include a second pointer (not shown) so that one may be writing in one address within memory 28 at the same time as reading from another address within the memory.

Returning to FIG. 5, block 82 leads to block 84 which tests to determine if the scanning is complete in a given direction. If the scanning is not complete, block 84 leads back to block 56 which continues the scan in the given direction. Note that a similar test block (not shown) to determine if scanning is complete in a given direction and upon it being complete to change to the next line direction for scanning might be disposed at the outputs of block 60 corresponding to A equal to zero or three and/or A equals to two, these other possible blocks not being shown for ease of illustration. If block 84 indicates that scanning is complete in a given direction, block 84 leads to block 86 which tests to determine if the thinning process is complete. This test may be accomplished by setting a flag when starting the scan in a first direction and changing the flag if any changes are made in the pixels. If the process returns to scanning in the first direction and the flag has not been changed, this would indicate that the thinning is complete. Other techniques might be used to determine when the thinning is complete. Upon thinning being complete, the image data would be limited to images of lines and/or dots and block 87 stops the thinning. If block 86 indicates that thinning is not complete, block 88 would next change the line direction. If the process is currently proceeding in the first direction, the line direction would then be changed to the second direction, the second direction would be changed to the third direction, the third direction would be changed to the fourth direction, and, if the process was scanning in the fourth direction, block 88 would change the line direction back to the first direction. Block 88 leads to block 56 which begins scanning in the appropriate direction.

If desired, one can further minimize the if or decisional operations of the process by taking out blocks 60 and 64 of FIG. 5. In that case, the weight table 36 of FIG. 4 would be increased to have nine storage locations (corresponding to all nine pixels), the partial sum block 48 of FIG. 4 would sum nine summations, and the look-up change table 34 of FIG. 4 would have 512 addresses corresponding to all combinations of ones and zeros for the pixels A-I (again considering that a pixel value of two or a pixel value of three would be considered the same as a pixel value of one). Such an arrangement would require increased size for the change table 34, but would avoid the decisional or if operations 60 and 64 of FIG. 5.

Figure 6:
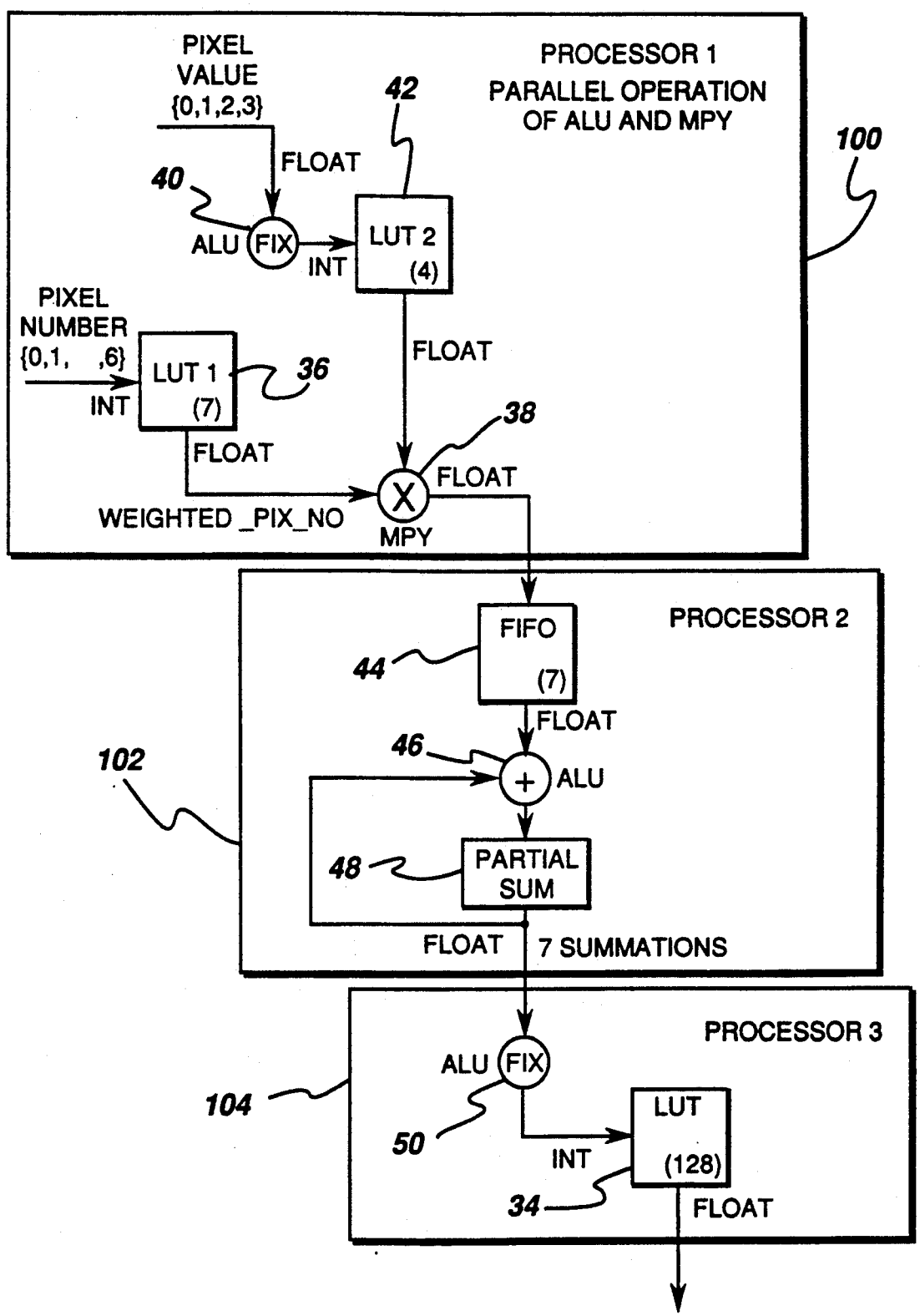
FIG. 6 is a diagram showing pipelined thinning in multiple parallel processor cells based upon the technique of FIG. 4.

FIG. 6 shows an arrangement wherein pipelined thinning is performed in multiple parallel processor cells to provide maximum speed and efficiency. In particular, the arrangement of FIG. 6 is implementing the process or procedure of FIG. 4 and provides for the first adder to run in parallel with the multiplier by use of different processors 100, 102, and 104. In the case of a iWarp ™ computer, an image can be divided into three equal parts and given to nine processing cells. In other words, there would be three arrangements such as FIG. 6 for the three different parts of an image. A tenth cell in such a computer could provide any housekeeping functions as required. Other divisions may be used in a reconfigurable parallel processing system such as iWarp to gain even more speed, up to the maximum throughput of the computing device.

Figure 7:
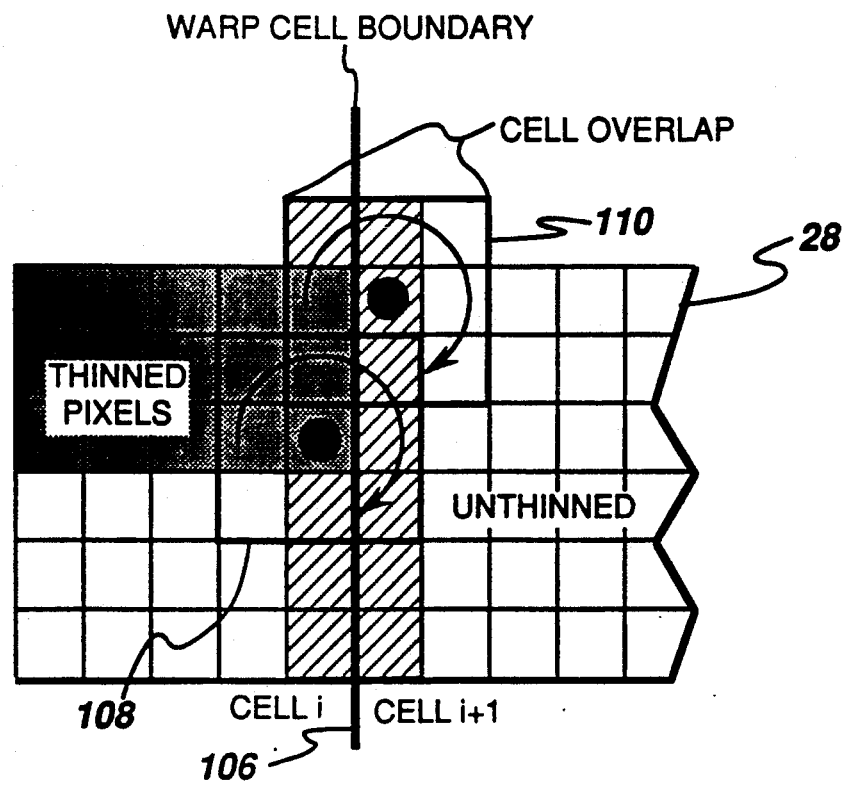
FIG. 7 shows how boundary partitioning would be accomplished for parallel processing using a technique such as that of FIG. 6.

Referring to FIG. 7, a portion of the image memory 28 is illustrated with a cell boundary 106 indicating that one of the parallel computer cells would operate to the left of the boundary and another of the parallel computer cells in a parallel processing arrangement like FIG. 6 would operate to the right of the boundary. FIG. 7 simply illustrates that, for the situation where one is scanning starting at the left and proceeding to the right, the cell to the left of partition 106 will be looking at neighborhood 108 when the cell to the right of partition 106 will be looking at neighborhood 110. This shows that the cell to the left of 106 must be sufficiently ahead of the cell to the right of partition 106 so that when neighborhood 110 is examined, the left cell will have already considered the pixels on the left side of partition 106, which partitions are a part of neighborhood 110. That is, the cell to the right of partition 106 cannot properly perform its process unless its initial cells which are just to the left of 106 have previously been processed.

Figure 8:
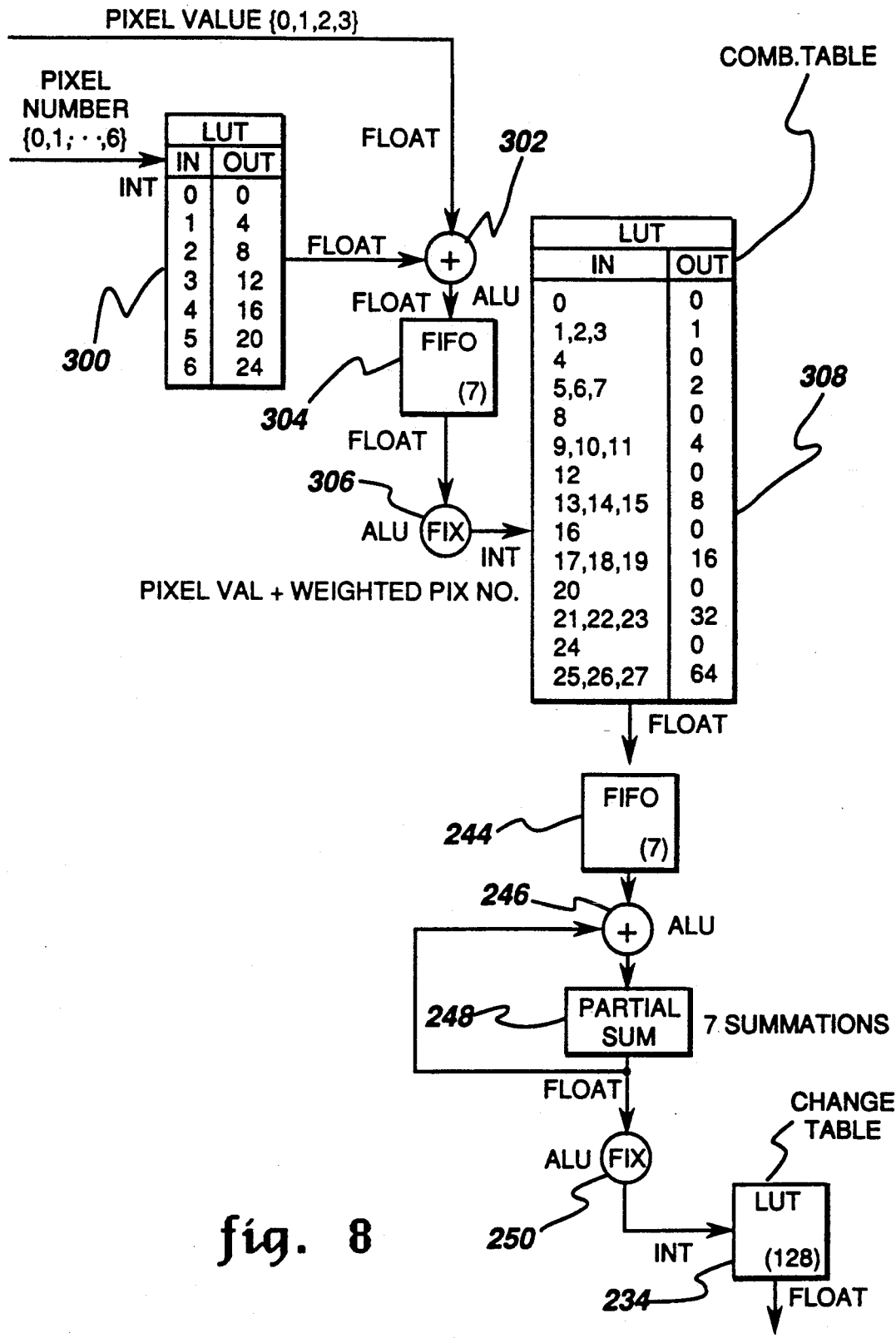
FIG. 8 shows pipelined thinning similar to FIG. 4, but without using any multiply step.

Turning now to FIG. 8, a technique is shown which allows accessing of a change table 234 without a multiply step such as multiplier 38 in the FIG. 4 arrangement. Various components of FIG. 8 which are identical to corresponding components in the FIG. 4 arrangement have been given numbers in the 200 series with the same last two digits as the corresponding component from the FIG. 4 arrangement. Thus, memory FIFO 244 (optionally as discussed with FIFO 44 of FIG. 4), ALU 246, partial sum block 248, ALU 250, and change table 234 of FIG. 8 function the same as the corresponding component in FIG. 4 and need not be discussed in detail.

An image memory such as used in FIG. 4 would be used in the FIG. 8 arrangement, but is not shown in FIG. 8 for ease of illustration. A pixel number from zero to six corresponding respectively to pixels C-I is provided to a weight table 300 at the same time as the value of the particular pixel is supplied to ALU 302 from the unshown image memory. The weight table 300 is different from weight table 36 of FIG. 4 since weight table 300 supplies a weight out of zero in response to pixel C (pixel no. 0) and since the value stored in look-up table 300 is four times the pixel number supplied at the input. Thus, an input of pixel number one supplies an output of four, an input of pixel number two supplies an output of eight, etc. The ALU 302 adds the pixel value to the weighted pixel number. The output of ALU 302 uniquely corresponds to a particular pixel number having a particular value. In other words, for a given output of ALU 302, one can determine not only which pixel number was supplied, but also what the pixel value was. This is possible because the outputs of weight table 300 are spaced four values apart. Following the floating point addition by ALU 302, the result is supplied to a memory FIFO 304, which is optional as discussed with respect to FIFO 44 of FIG. 4. The output of FIFO 304 (or the direct output of ALU 302 if the FIFO is not used) is supplied to ALU 306 which changes from a floating point representation to an integer for accessing a combination table 308. The combination table 308 is a look-up table having outputs which, for a given pixel number having a given value, would be the same as the output of multiply 38 of FIG. 4. Thus, if pixel number zero corresponding to pixel C has a value of one, two, or three, the output from combination table 308 will be one in any of those cases. In effect, the combination table 308 is performing in somewhat similar fashion to the value table 42 of FIG. 4 since it considers pixel values of two and three to be the same as pixel values of one.

The output of combination table 308 would be supplied to the ALU 246 either directly or by way of FIFO 244. Block 248 and ALU 250 would function is the same fashion as the corresponding components of FIG. 4 in order to generate an address which corresponds on a one-to-one basis with a particular combination of values for the pixels C–I, it again being noted that pixel values of two and three are considered the same as pixel values of one in terms of this one-to-one relationship. In other words, a pixel value of two is simply an indication, as discussed with respect to FIG. 4, that the pixel value is one and will be changed to zero. In similar fashion, a pixel value of three simply indicates that the pixel has a value of one and includes the additional information that the pixel will never be changed. The look-up table 234 of FIG. 8 would be identical to table 34 of FIG. 4 and outputs a value of two as the pix out if the particular target pixel A is to be changed to zero. The pix out value is three if the particular target pixel A is never to be changed.

Figure 9:
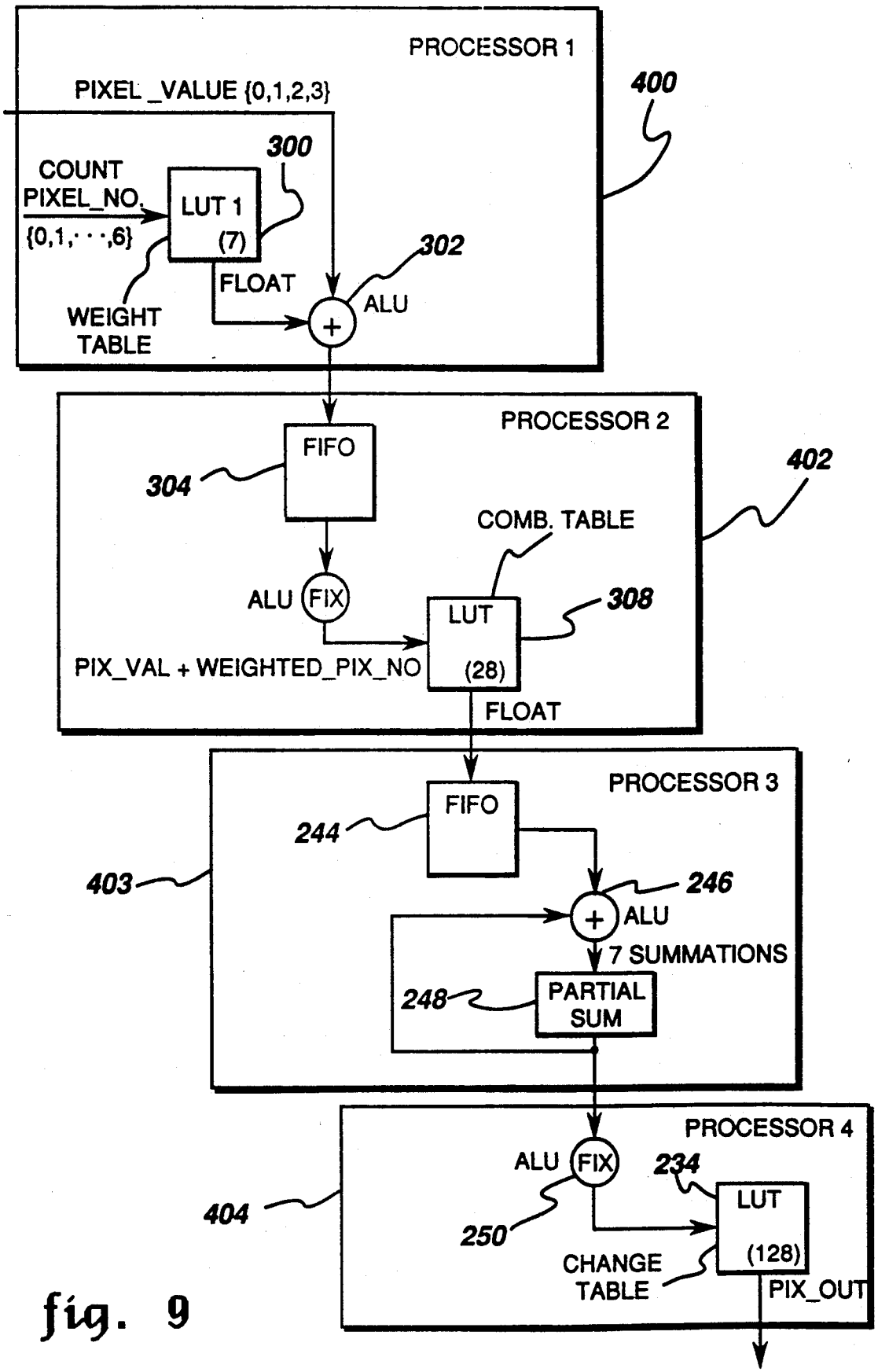
FIG. 9 is a diagram illustrating how the technique of FIG. 8 could be accomplished with multiple parallel processor cells.

Turning now to FIG. 9, an arrangement is illustrated as to use of multiple parallel processor cells 400, 402, 403, and 404 may be used to provide maximum speed and efficiency for the pipelined thinning of FIG. 8. This pipelining, using four processing cells, maintains a full pipe and thereby obtains the maximum efficiency possible for the processing cells. That is, on every clock, a new pixel value enters the process. The thinning decision based on the seven neighborhood pixels, is made by the seventh clock and an output is presented. An image (such as described earlier as typically having 512 by 512 pixels) can be apportioned among four-cell sets of parallel processors. In the case of use of the ten-cell Warp parallel processing system, an image can be divided into two equal parts and given to eight processing cells. The remaining two cells can provide any necessary housekeeping functions. Of course, other divisions are possible in a reconfigurable parallel processing system such as iWarp to gain even more speed, up to the maximum throughput of the computing device.

Referring back now to FIG. 1, the thinning process will change the Image In to the Image Out of that figure by effectively whittling away at the edges of the image shown therein. Initially, one will scan in the first direction and remove a one pixel strip at the left edge or edges of the image. Then one would scan from the second direction and remove a one pixel strip from the right edges. Next one would scan with a line direction in the third direction and remove a one pixel strip along the upper edges of the image. The process then scans using a line direction in the fourth direction to remove a one pixel strip along the lower edges of the object. The process then returns to the scanning in the first direction and repeats the scanning for all four directions until all remaining pixels having a value other than zero have been marked for no change. One may then simply change those pixels from value three to value one and display them as the image out. Alternately, the pixels need not be changed from value three (indicating no change ever) to value one but the display to which the image data is supplied, such as display 26 of FIG. 3, may simply have a built-in threshold such that values of three are displayed in the same fashion as values of one. In other words, the display 26 could be designed for displaying pixel data in Boolean form.

Although specific constructions and arrangements have been shown herein, it is to be understood that these are for illustrative purposes only. Various modifications and adaptations will be apparent to those of skill in the art. Accordingly, the scope of the present invention should be determined by reference to the claims appended hereto.

TABLE 1

APPENDIX

| case# | before → | after | other info |
|---|---|---|---|
| | 000 | 000 | bin# 0000000 oct# 0 |
| # 0 → | 010 → | 0 × 0 | k = 0 c = 0 |
| | 000 | 000 | change# 1 |
| | 110 | 110 | bin# 0000011 oct# 3 |
| # 3 → | 010 → | 0 × 0 | k = 2 c = 2 |
| | 000 | 000 | change# 2 |
| | 011 | 011 | bin# 0000110 oct# 6 |
| # 6 → | 010 → | 0 × 0 | k = 2 c = 2 |
| | 000 | 000 | change# 3 |
| | 111 | 111 | bin# 0000111 oct# 7 |
| # 7 → | 010 → | 0 × 0 | k = 3 c = 2 |
| | 000 | 000 | change# 4 |
| | 001 | 001 | bin# 0001100 oct# 14 |
| # 12 → | 011 → | 0 × 1 | k = 2 c = 2 |
| | 000 | 000 | change# 5 |
| | 011 | 011 | bin# 0001110 oct# 16 |
| # 14 → | 011 → | 0 × 1 | k = 3 c = 2 |
| | 000 | 000 | change# 6 |
| | 111 | 111 | bin# 0001111 oct# 17 |
| # 15 → | 011 → | 0 × 1 | k = 4 c = 2 |
| | 000 | 000 | change# 7 |
| | 000 | 000 | bin# 0011000 oct# 30 |
| # 24 → | 011 → | 0 × 1 | k = 2 c = 2 |
| | 001 | 001 | change# 8 |
| | 001 | 001 | bin# 0011100 oct# 34 |
| # 28 → | 011 → | 0 × 1 | k = 3 c = 2 |
| | 001 | 001 | change# 9 |
| | 011 | 011 | bin# 0011110 oct# 36 |
| # 30 → | 011 → | 0 × 1 | k = 4 c = 2 |
| | 001 | 001 | change# 10 |
| | 111 | 111 | bin# 0011111 oct# 37 |
| # 31 → | 011 → | 0 × 1 | k = 5 c = 2 |
| | 001 | 001 | change# 11 |
| | 000 | 000 | bin# 0110000 oct# 60 |
| # 48 → | 010 → | 0 × 0 | k = 2 c = 2 |
| | 011 | 011 | change# 12 |
| | 000 | 000 | bin# 0111000 oct# 70 |
| # 56 → | 011 → | 0 × 1 | k = 3 c = 2 |
| | 011 | 011 | change# 13 |
| | 001 | 001 | bin# 0111100 oct# 74 |
| # 60 → | 011 → | 0 × 1 | k = 4 c = 2 |
| | 011 | 011 | change# 14 |
| | 011 | 011 | bin# 0111110 oct# 76 |
| # 62 → | 011 → | 0 × 1 | k = 5 c = 2 |
| | 011 | 011 | change# 15 |
| | 111 | 111 | bin# 0111111 oct# 77 |
| # 63 → | 011 → | 0 × 1 | k = 6 c = 2 |
| | 011 | 011 | change# 16 |
| | 000 | 000 | bin# 1100000 oct# 140 |
| # 96 → | 010 → | 0 × 0 | k = 2 c = 2 |
| | 110 | 110 | change# 17 |
| | 000 | 000 | bin# 1110000 oct# 160 |
| #112 → | 010 → | 0 × 0 | k = 3 c = 2 |
| | 111 | 111 | change# 18 |
| | 000 | 000 | bin# 1111000 oct# 170 |
| # 120 → | 011 → | 0 × 1 | k = 4 c = 2 |
| | 111 | 111 | change# 19 |
| | 001 | 001 | bin# 1111100 oct# 174 |
| # 124 → | 011 → | 0 × 1 | k = 5 c = 2 |
| | 111 | 111 | change# 20 |
| | 011 | 011 | bin# 1111110 oct# 176 |
| # 126 → | 011 → | 0 × 1 | k = 6 c = 2 |
| | 111 | 111 | change# 21 |
| | 111 | 111 | bin# 1111111 oct# 177 |
| # 127 → | 011 → | 0 × 1 | k = 7 c = 2 |
| | 111 | 111 | change# 22 |

What is claimed is:

1. A method of thinning images, in an image data processing system, comprising the steps of, for a line direction initially extending in a first direction:

(a) scanning image data in an image memory in a scan pattern line by line, each line extending in said line direction, in order to determine whether pixels of image data in the lines should be changed in order to thin images in the image data;

(b) selecting, by way of the scanning, a particular pixel A to be considered for possible change in its value, said A pixel having corresponding pixels B, C, D, E, F, G, H, and I around it to define a pixel neighborhood about that pixel A, a line from pixel B to pixel A extending in said line direction, pixels C, D, E, F, G, H, and I being disposed in clockwise order from pixel B and around and adjacent to pixel A, (c) generating an address which is associated with pixel A and which is dependent on values of at least a plurality of the pixels C, D, E, F, G, H, and I;

(d) addressing a change look-up table stored in a memory of said image data processing system using said address so as to read out a change signal indicative of whether a change should be made in the value of pixel A;

(e) changing the value of pixel A if said change signal indicates that it should be changed;

(f) repeating steps (b) through (e) for different selected pixels A, one pixel A being selected at a time; and (g) repeating steps (a) through (f) for a line direction extending in a second direction, repeating steps (a) through (f) for a line direction extending in a third direction, and repeating steps (a) through (f) for a line direction extending in a fourth direction, each of said first, second, third, and fourth directions being perpendicular or anti-parallel to each of the other of said first, second, third and fourth directions, and wherein the changing of values of pixels causes the thinning of images in the image data and wherein the step of generating the address includes:

addressing a weight look-up table to assign a unique weight to each of the pixels C, D, E, F, G, H, and I;

performing a pixel arithmetic operation for each of the pixels C, D, E, F, G, H, and I using the weight and the value for the pixel; and combining results of said pixel arithmetic operations to provide the address.

2. The method of claim 1 wherein steps (a) through (g) are repeated until the resulting image data is limited to images of lines and/or dots.

3. The method of claim 2 wherein the address generated for association with each pixel A is a function of values of the corresponding pixels C, D, E, F, G, H, and I.

4. The method of claim 3 wherein the address generated for association with a particular pixel A is independent of pixel values other than the values of corresponding pixels C, D, E, F, G, H, and I.

5. The method of claim 1 wherein the change look-up table outputs a change signal having only two values, a change to zero value if a particular pixel A is to be changed and a no change ever value if a particular pixel is not to be changed.

6. The method of claim 5 wherein the change signal is a pix out value which is written into the image memory to change the image data in place.

7. The method of claim 1 wherein a pixel number, which corresponds to the order of the pixel in a particular sequence of the pixels C, D, E, F, G, H, and I, is used to address the weight look-up table so as to output a weight for a pixel, and wherein said combining is performed by adding the results of said pixel arithmetic operations.

8. The method of claim 7 wherein the pixel arithmetic operations are the multiplication of the weight of a pixel by value of the pixel.

9. The method of claim 7 wherein the pixel arithmetic operations are the addition of the weight of a pixel to a value of the pixel.

10. The method of claim 7 wherein the pixel arithmetic operations are floating point operations.

11. The method of claim 7 wherein a pixel A is changed only if k is not 1 and n is less than 4, where k is the number of pixels C, D, E, F, G, H, and I having a value of 1 and n is the number of neighbor state changes about A.

12. The method of claim 1 wherein a pixel A is changed only if k is not 1 and n is less than 4, where k is the number of pixels C, D, E, F, G, H, and I having a value of 1 and n is the number of neighbor state changes about A.

13. The method of claim 1 wherein the image data processing system performs the generation of an address associated with a pixel A using a floating point processor.

14. The method of claim 1 wherein the image data processing system performs the generation of an address associated with a pixel A using a floating point processor for a pipeline procedure.

15. The method of claim 1 further comprising the steps of detecting energy in a form dependent on, and representative of, a zone under test, generating the image data from the energy which is detected, and displaying image data resulting from completion of the changing of values of pixels.

16. The method of claim 1 further comprising the steps of applying energy to the zone under test, and wherein the energy which is detected results from the applied energy.

17. The method of claim 1 wherein the unique weight assigned to each of the pixels C, D, E, F, G, H, and I by addressing the weight look-up table is independent of image data.

18. An image data processing system comprising:

means to establish a line direction sequentially in first, second, third, and fourth directions, each of said first, second, third, and fourth directions being either perpendicular or anti-parallel to each of the other of said first, second, third, and fourth directions;

scanning means to scan image data in a scan pattern line by line, each line extending in said line direction, in order to determine whether pixels of image data in the lines should be changed so as to thin images in the image data;

selecting means to select, by way of the scanning, particular pixels to be considered for possible change, each particular pixel A having corresponding pixels B, C, D, E, F, G, H, and I around it to define a pixel neighborhood about that pixel A, a line from pixel B to pixel A extending in said line direction, pixels C, D, E, F, G, H, and I being disposed in clockwise order from pixel B and around and adjacent to pixel A;

address generating means for generating an address which is associated with pixel A and which is dependent on values of at least a plurality of the corresponding pixels B, C, D, E, F, G, H, and I;

a change look-up table stored in memory addressable by the address associated with pixel A to read out a change signal indicative of whether a change should be made in pixel A; and means for changing the value of pixel A if said change signal indicates that it should be changed; and wherein the changing of values of pixels causes the thinning of images in the image data and wherein said address generating means comprises:

look-up table means for assigning a unique weight to each of the pixels C, D, E, F, G, H, and I;

means for performing a pixel arithmetic operation for each of the pixels C, D, E, F, G, H, and I using the weight and the value for the pixel; and means for combining results of said pixel arithmetic operations to provide the address.

19. The image data processing system of claim 18 further comprising a detector for detecting energy in a form dependent on, and representative of, a zone under test, an image generator for generating the image data based upon the energy which is detected, and a display for displaying image data resulting from completion of the changing of values of pixels.

20. The system of claim 19 further comprising means for applying energy to the zone under test, and wherein the energy which is detected results from the applied energy.

21. The system of claim 18 wherein the means for changing the value of pixel A changes values so as to limit the image data to images of lines and/or dots.

22. The system of claim 18 wherein the address generating means uses a pipelined procedure to generate an address for association with a particular pixel A which is a function of values of the corresponding pixels C, D, E, F, G, H, and I.

23. The system of claim 18 wherein said means for performing a pixel arithmetic operation performs a floating point operation and is part of a floating point processor.

24. The system of claim 18 wherein said means for assigning a unique weight assigns a weight to each of the pixels C, D, E, F, G, H, and I which is independent of the image data.

* * * * *